United States Patent
Avagliano et al.

(10) Patent No.: US 8,673,034 B2
(45) Date of Patent: Mar. 18, 2014

(54) METHODS AND SYSTEMS FOR INTEGRATED BOILER FEED WATER HEATING

(75) Inventors: Aaron John Avagliano, Houston, TX (US); Paul Steven Wallace, Katy, TX (US)

(73) Assignee: General Electric Company, Schenectady, NY (US)

( * ) Notice: Subject to any disclaimer, the term of this patent is extended or adjusted under 35 U.S.C. 154(b) by 480 days.

(21) Appl. No.: 12/034,974

(22) Filed: Feb. 21, 2008

(65) Prior Publication Data

US 2009/0211155 A1 Aug. 27, 2009

(51) Int. Cl.
*B01J 7/00* (2006.01)

(52) U.S. Cl.
USPC .......................................................... 48/61

(58) Field of Classification Search
USPC ...... 48/61–118.5, 127.1, 127.9, 197 R–197 A
See application file for complete search history.

(56) References Cited

U.S. PATENT DOCUMENTS

| | | | |
|---|---|---|---|
| 4,831,817 A | 5/1989 | Linhardt | |
| 5,081,845 A | 1/1992 | Allam et al. | |
| 5,620,487 A | 4/1997 | Andrus | |
| 5,628,183 A | 5/1997 | Rice | |
| 5,688,296 A | 11/1997 | Andrus et al. | |
| 6,256,994 B1 | 7/2001 | Dillon | |
| 6,263,659 B1 | 7/2001 | Dillon et al. | |
| 6,655,150 B1 | 12/2003 | Åsen et al. | |
| 6,824,575 B1 | 11/2004 | Otomo et al. | |
| 7,278,267 B2 | 10/2007 | Yamada et al. | |
| 2002/0004533 A1 | 1/2002 | Wallace et al. | |
| 2008/0011247 A1 | 1/2008 | Alexander | |
| 2009/0019767 A1* | 1/2009 | Abughazaleh et al. ........... | 48/61 |

FOREIGN PATENT DOCUMENTS

| | | |
|---|---|---|
| CN | 101050390 A | 10/2007 |
| EP | 1197639 A2 | 4/2002 |
| GB | 2296255 A | 6/1996 |

OTHER PUBLICATIONS

An EP International Search Report, dated Aug. 8, 2011, for co-pending International Application No. PCT/US2009031642 (13 pages).
Unofficial English translation of CN Office Action dated Jan. 31, 2013 from corresponding CN Application No. 200980106369.8.

* cited by examiner

*Primary Examiner* — Imran Akram
(74) *Attorney, Agent, or Firm* — Armstrong Teasdale LLP

(57) ABSTRACT

Methods and systems for a gasifier system are provided. The gasifier system includes a gasifier including a syngas cooler configured to transfer heat from a reaction zone of the gasifier to a flow of fluid through the syngas cooler, a reaction vessel coupled in flow communication with the syngas cooler wherein the reaction vessel is adapted to receive the flow of fluid and generate heat in an exothermic shift reaction. The system also includes a heat exchanger coupled in flow communication with the reaction vessel, the heat exchanger adapted to produce relatively high pressure steam using the generated heat.

10 Claims, 3 Drawing Sheets

US 8,673,034 B2

METHODS AND SYSTEMS FOR INTEGRATED BOILER FEED WATER HEATING

BACKGROUND OF THE INVENTION

This invention relates generally to integrated gasification combined-cycle (IGCC) power generation systems, and more specifically to methods and systems for optimizing heat transfer between a gasifier syngas cooler and a shift system in the IGCC system.

At least some known IGCC systems include a gasification system that is integrated with at least one power producing turbine system. For example, known gasifiers convert a mixture of fuel, air or oxygen, steam, limestone, and/or other additives into an output of partially combusted gas, sometimes referred to as "syngas." The hot combustion gases are supplied to the combustor of a gas turbine engine, which powers a generator that supplies electrical power to a power grid. Exhaust from at least some known gas turbine engines is supplied to a heat recovery steam generator that generates steam for driving a steam turbine. Power generated by the steam turbine also drives an electrical generator that provides electrical power to the power grid.

At least some known gasification processes use a separate shift heat recovery system with feed product exchangers. Such a configuration requires an external heat source for pre-heating gasification feed to start the exothermic reaction in the shift reactor. Pre-heating in this configuration causes the production of medium pressure and intermediate pressure steam, which has limited usefulness in other parts of the process and reduces total plant efficiency.

BRIEF DESCRIPTION OF THE INVENTION

In one embodiment, a gasifier system includes a gasifier including a syngas cooler configured to transfer heat from a reaction zone of the gasifier to a flow of fluid through the syngas cooler, a reaction vessel coupled in flow communication with the syngas cooler wherein the reaction vessel is adapted to receive the flow of fluid and generate heat in an exothermic shift reaction. The system also includes a heat exchanger coupled in flow communication with the reaction vessel wherein the heat exchanger is adapted to produce relatively high pressure steam using the generated heat.

In another embodiment, a method of operating a gasifier system includes supplying a flow of shift feed to a shift reactor, generating heat in a flow of shift effluent using an exothermic shift reaction in the shift reactor, and channeling the flow of shift effluent to a heat exchanger such that relatively high pressure steam is produced using the generated heat.

In yet another embodiment, a gasification system includes a pressure vessel including an internal syngas cooler configured to remove heat from a reaction zone in the pressure vessel, a shift reactor in flow communication with the pressure vessel, the shift reactor configured to receive a flow of syngas from the pressure vessel, and a flow of high pressure steam feed in flow communication with a first circuit of a first heat exchanger, the first heat exchanger configured to preheat the flow of high pressure steam feed.

DETAILED DESCRIPTION OF THE INVENTION

Figure 1:
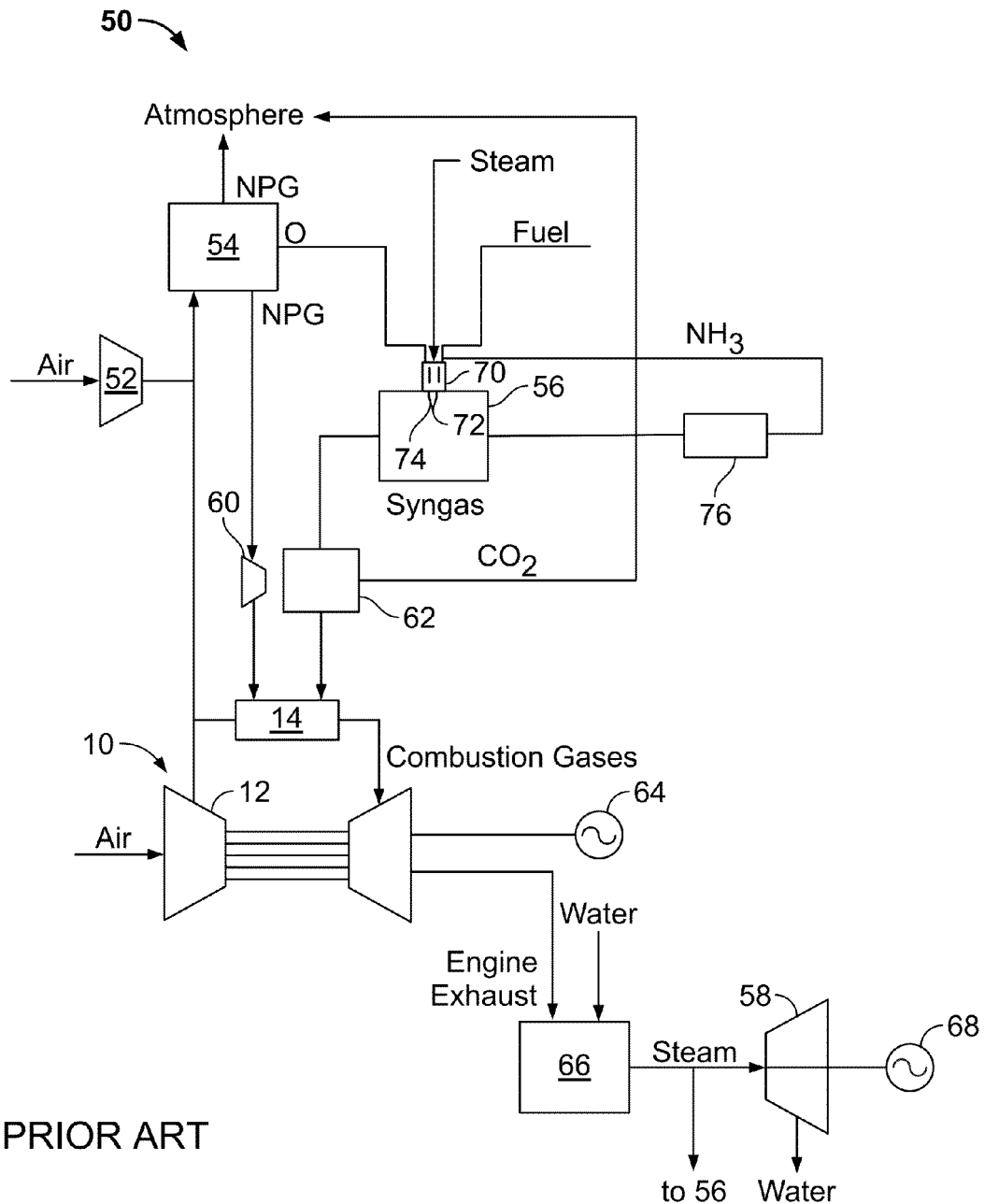
FIG. 1 is a schematic diagram of an exemplary known integrated gasification combined-cycle (IGCC) power generation system.

FIG. 1 is a schematic diagram of an exemplary known integrated gasification combined-cycle (IGCC) power generation system 50. IGCC system 50 generally includes a main air compressor 52, an air separation unit 54 coupled in flow communication to compressor 52, a gasifier 56 coupled in flow communication to air separation unit 54, a gas turbine engine 10, coupled in flow communication to gasifier 56, and a steam turbine 58. In operation, compressor 52 compresses ambient air. The compressed air is channeled to air separation unit 54. In some embodiments, in addition or alternative to compressor 52, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen and a gas by-product, sometimes referred to as a "process gas". The process gas generated by air separation unit 54 includes nitrogen and will be referred to herein as "nitrogen process gas." The nitrogen process gas may also include other gases such as, but not limited to, oxygen and/or argon. For example, in some embodiments, the nitrogen process gas includes between about 95% and about 100% nitrogen. The oxygen flow is channeled to gasifier 56 for use in generating partially combusted gases, referred to herein as "syngas" for use by gas turbine engine 10 as fuel, as described below in more detail. In some known IGCC systems 50, at least some of the nitrogen process gas flow, a by-product of air separation unit 54, is vented to the atmosphere. Moreover, in some known IGCC systems 50, some of the nitrogen process gas flow is injected into a combustion zone (not shown) within gas turbine engine combustor 14 to facilitate controlling emissions of engine 10, and more specifically to facilitate reducing the combustion temperature and reducing nitrous oxide emissions from engine 10. IGCC system 50 may include a compressor 60 for compressing the nitrogen process gas flow before being injected into the combustion zone.

Gasifier 56 converts a mixture of fuel, the oxygen supplied by air separation unit 54, steam, and/or limestone into an output of syngas for use by gas turbine engine 10 as fuel. Although gasifier 56 may use any fuel, in some known IGCC systems 50, gasifier 56 uses coal, petroleum coke, residual oil, oil emulsions, tar sands, and/or other similar fuels. In some known IGCC systems 50, the syngas generated by gasifier 56 includes carbon dioxide. The syngas generated by gasifier 56 may be cleaned in a clean-up device 62 before being channeled to gas turbine engine combustor 14 for combustion thereof. Carbon dioxide may be separated from the syngas during clean-up and, in some known IGCC systems 50, vented to the atmosphere. The power output from gas turbine engine 10 drives a generator 64 that supplies electrical power to a power grid (not shown). Exhaust gas from gas turbine engine 10 is supplied to a heat recovery steam generator (HRSG) 66 that generates steam for driving steam turbine 58. Power generated by steam turbine 58 drives an electrical generator 68 that provides electrical power to the power grid. In some known IGCC systems 50, steam from HRSG 66 is supplied to gasifier 56 for generating the syngas.

In the exemplary embodiment, gasifier 56 includes an injection nozzle 70 extending through gasifier 56. Injection nozzle 70 includes a nozzle tip 72 at a distal end 74 of injection nozzle 70. Injection nozzle 70 further includes a port (not shown in FIG. 1) that is configured to direct a stream of fluid proximate nozzle tip 72 such that the stream of fluid facilitates reducing a temperature of at least a portion of nozzle tip 72. In the exemplary embodiment, injection nozzle 70 is configured to direct a stream of ammonia proximate nozzle tip 72 such that the stream of ammonia facilitates reducing a temperature of at least a portion of nozzle tip 72.

In the exemplary embodiment, IGCC system 50 includes a syngas condensate stripper configured to receive condensate from a stream of syngas discharged from gasifier 56. The condensate typically includes a quantity of ammonia dissolved in the condensate. At least a portion of the dissolved ammonia is formed in gasifier 56 from a combination nitrogen gas and hydrogen in gasifier 56. To remove the dissolved ammonia from the condensate the condensate in raised to a temperature sufficient to induce boiling in the condensate. The stripped ammonia is discharged from stripper 76 and returned to gasifier 56 at a pressure higher than that of the gasifier, to be decomposed in the relatively high temperature region of the gasifier proximate nozzle tip 72. The ammonia is injected such that the flow of ammonia in the vicinity of the high temperature area proximate nozzle tip 72 facilitates cooling nozzle tip 72.

Figure 2:
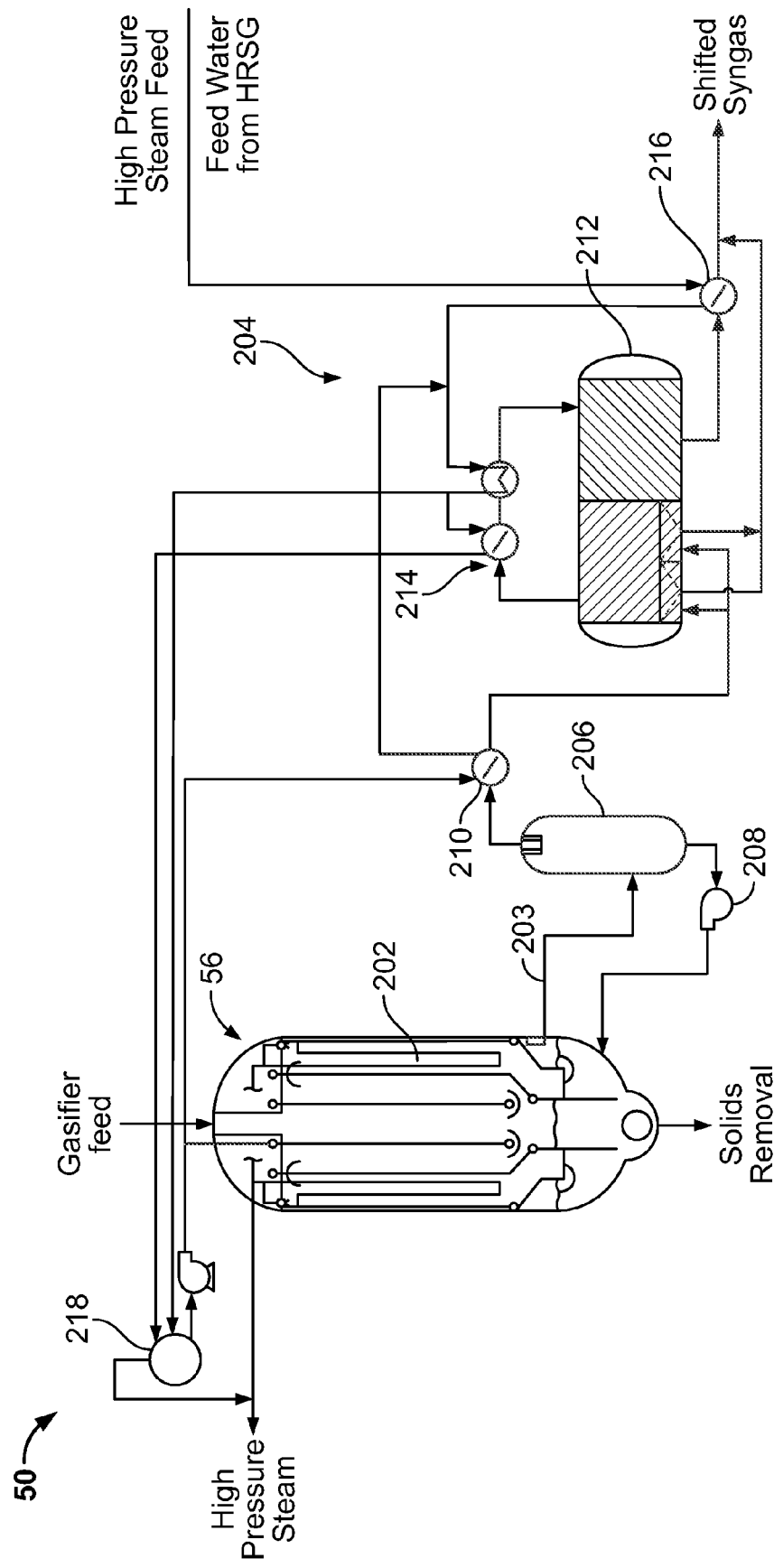
FIG. 2 is a schematic diagram of a portion of the IGCC shown in FIG. 1 including a gasifier having an integral syngas cooler and a shift system.

FIG. 2 is a schematic diagram of a portion of IGCC 50 in accordance with an exemplary embodiment of the present invention, including gasifier 56 having an integral radiant syngas cooler 202 and a shift system 204. Although illustrated in FIG. 2 as an integral radiant syngas cooler, in other embodiments cooler 202 may be positioned in a vessel separate from gasifier 56. In the exemplary embodiment, a flow of syngas is channeled to shift system 204 through a conduit 203, which includes a shift knock out drum 206 that permits expansion of the syngas flow with a resultant drop out of condensate which may be collected within shift knock out drum 206 and pumped back into gasifier 56 using pump 208. A syngas effluent is channeled to a heat exchanger 210 where a flow of condensed high pressure steam flowing through the tubes of heat exchanger 210 transfers a portion of its heat content to the knocked out syngas. In the exemplary embodiment, the temperature of the syngas is increased from approximately 450° F. to approximately 550° F. The preheated syngas is channeled to a two stage shift reactor 212 where an exothermic catalytic reaction converts carbon monoxide and water to carbon dioxide and hydrogen by the formula:

$$CO + H_2O \rightleftharpoons CO_2 + H_2 \quad (1)$$

In the exemplary embodiment, at an intermediate point between the two stages of shift reactor 212, the partially shifted gas is channeled to at least one heat exchanger 214 before reentering shift reactor 212 to undergo the second shift reaction. The shifted syngas is channeled through an economizer 216 that facilitates pre-heating the high pressure steam feedwater using heat from the shifted syngas. High pressure steam is collected in gasifier steam drum 218 for use throughout system 50.

During startup, hot feedwater from syngas cooler 202 is used to pre-heat shift feed. The hot shift effluent gas generates high pressure steam in heat exchanger 214 and pre-heats feed water to syngas cooler 202. This configuration permits generation of only high pressure steam without generating medium and low pressure steam and eliminates the need for separate startup shift pre-heaters. It also provides fully economized boiler feedwater to the syngas cooler for maximum steam generation.

Figure 3:
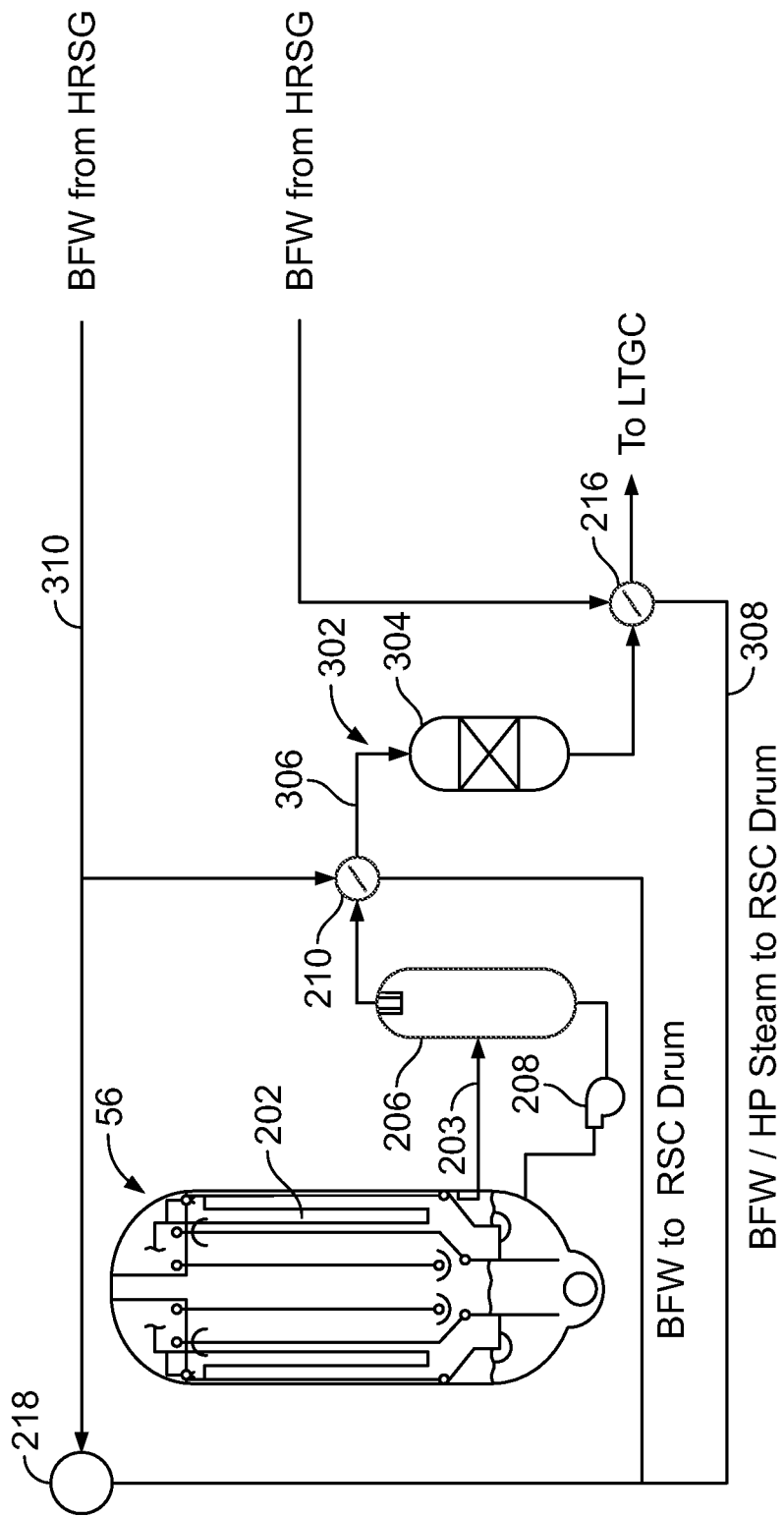
FIG. 3 is a schematic diagram of a portion of the IGCC (shown in FIG. 1) in accordance with another exemplary embodiment of the present invention.

FIG. 3 is a schematic diagram of a portion of IGCC 50 in accordance with another exemplary embodiment of the present invention, including gasifier 56 having an integral radiant syngas cooler 202 and a shift system 302. In other embodiments, cooler 202 is positioned in a separate vessel coupled in flow communication with gasifier 56. In the exemplary embodiment, a flow of syngas is channeled to shift knock out drum 206 through conduit 203. Shift knock out drum 206 permits expansion of the syngas flow with a resultant drop out of condensate which is collected within shift knock out drum 206 and pumped back into gasifier 56 using pump 208. A syngas effluent from shift knock out drum 206 is channeled to heat exchanger 210 where a flow of condensed high pressure steam or feedwater from for example, HRSG 66, flowing through the tubes of heat exchanger 210 transfers a portion of its heat content to the knocked out syngas. In the exemplary embodiment, the temperature of the syngas is increased from approximately 450° F. to approximately 550° F. The preheated syngas is channeled to shift reactor 304 through conduit 306 where an exothermic catalytic reaction converts carbon monoxide and water to carbon dioxide and hydrogen. The heat of the exothermic reaction increases the temperature of the exiting syngas from approximately 550° F. to approximately 800° F.

In the exemplary embodiment, the shifted syngas is channeled through economizer 216 that facilitates pre-heating high pressure steam feedwater using heat from the shifted syngas and cooling the shifted syngas to approximately 300° F. to approximately 400° F. The syngas is then channeled to a low temperature gas cooling unit (not shown) for further processing. The economized feedwater is channeled to drum 218 through conduit 308.

During startup, hot shift effluent gas is used to preheat relatively cool feedwater from the HRSG from approximately 300° F. to approximately 600° F. in economizer 216. As the startup progresses and the feedwater temperature increases, the feedwater may be channeled directly to drum 218 through conduit 310.

Exemplary embodiments of gasification systems and methods of optimizing heat transfer between a gasifier, a syngas cooler, and a shift system in the IGCC system are described above in detail. The gasification system components illustrated are not limited to the specific embodiments described herein, but rather, components of each system may be utilized independently and separately from other components described herein. For example, the gasification system components described above may also be used in combination with different IGCC system components or separately from a gas turbine engine power plant or a combined cycle power plant.

The above-described gasification systems and methods are cost-effective and highly reliable. The method permits optimizing heat transfer between a gasifier, a syngas cooler, and a shift system and permits generation of only high pressure steam without generating medium and low pressure steam and eliminates the need for separate startup shift pre-heaters. Accordingly, the gasification systems and methods described herein facilitate the operation of gasification systems such as integrated gasification combined-cycle (IGCC) power generation systems in a cost-effective and reliable manner.

While the invention has been described in terms of various specific embodiments, it will be recognized that the invention can be practiced with modification within the spirit and scope of the claims.

What is claimed is:

1. A gasifier system comprising:
a gasifier comprising a radiant cooler configured to transfer heat from a reaction zone of the gasifier to a flow of fluid through the radiant cooler;
a shift knock out drum directly coupled to said gasifier and configured to remove condensate from the flow of fluid;
a first heat exchanger directly coupled to said shift knock out drum, said first heat exchanger positioned to receive the flow of fluid discharged from said shift knock out drum, said first heat exchanger comprising at least one tube that includes relatively high pressure steam, said first heat exchanger increasing a temperature of the flow of fluid therethrough by transferring a portion of heat from the relatively high pressure steam to the flow of fluid;
a reaction vessel coupled in flow communication with said first heat exchanger, said reaction vessel adapted to receive said flow of fluid from said first heat exchanger and generate heat in an exothermic shift reaction;
a second heat exchanger coupled in flow communication downstream from said reaction vessel, said second heat exchanger adapted to produce the relatively high pressure steam using the generated heat; and
a gasifier steam drum coupled in flow communication with said second heat exchanger and configured to receive the relatively high pressure steam from said second heat exchanger.

2. A gasifier system in accordance with claim 1 wherein said flow of fluid comprises a flow of syngas, said syngas comprising carbon monoxide (CO), said shift reaction comprising a reaction of water with the CO to produce at least hydrogen, carbon dioxide, and heat.

3. A gasifier system in accordance with claim 1 wherein said second heat exchanger comprises a feedwater circuit configured to channel a flow of feedwater through the heat exchanger and a syngas circuit configured to channel a flow of syngas through said second heat exchanger, said second heat exchanger further adapted to transfer heat from said flow of syngas in said syngas circuit to said flow of feedwater in said feedwater circuit.

4. A gasifier system in accordance with claim 1 further comprising an economizer adapted to pre-heat a flow of feedwater using said flow of fluid heated by said first heat exchanger.

5. A gasifier system in accordance with claim 1 wherein said reaction vessel comprises a two stage shift reactor.

6. A gasifier system in accordance with claim 5 further comprising a second shift reactor.

7. A gasification system comprising:
a pressure vessel comprising an internal radiant cooler configured to transfer heat from a reaction zone in said pressure vessel to syngas flowing through the internal radiant cooler;
a shift knock out drum directly coupled to said pressure vessel and configured to remove condensate from the syngas;
a first heat exchanger directly coupled to said shift knock out drum, said first heat exchanger positioned to receive the flow of syngas discharged from said shift knock out drum, said first heat exchanger comprising at least one tube that includes high pressure steam, said first heat exchanger increasing a temperature of the flow of syngas by transferring a portion of heat from the high pressure steam to the flow of syngas;
a shift reactor in flow communication with said first heat exchanger, said shift reactor configured to receive the flow of the heated syngas from said first heat exchanger, said shift reactor further configured to facilitate an exothermic shift reaction of the flow of the heated syngas from said first heat exchanger to further increase a temperature of the flow of the heated syngas; and
a second heat exchanger coupled in flow communication with said shift reactor, said second heat exchanger configured to receive the heated flow of syngas from said shift reactor, and to produce the high pressure steam.

8. A gasification system in accordance with claim 7, further comprising an economizer configured to heat high pressure steam feedwater using heat from the syngas heated by the exothermic shift reaction.

9. A gasification system in accordance with claim 8, wherein said economizer is further configured to cool the syngas heated by the exothermic shift reaction and provide the cooled syngas to a low temperature cooling unit.

10. A gasification system in accordance with claim 8, further comprising a drum in flow communication with said economizer and configured to receive the heated high pressure steam feedwater from said economizer.

* * * * *